United States Patent
Sasaki et al.

(10) Patent No.: US 8,749,205 B2
(45) Date of Patent: Jun. 10, 2014

(54) CONTROL DEVICE FOR VEHICLE AC GENERATOR

(75) Inventors: Junya Sasaki, Chiyoda-ku (JP);
Katsuyuki Sumimoto, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 316 days.

(21) Appl. No.: 13/384,994

(22) PCT Filed: Nov. 20, 2009

(86) PCT No.: PCT/JP2009/069717
§ 371 (c)(1),
(2), (4) Date: Jan. 19, 2012

(87) PCT Pub. No.: WO2011/061853
PCT Pub. Date: May 26, 2011

(65) Prior Publication Data
US 2012/0262128 A1  Oct. 18, 2012

(51) Int. Cl.
*H02P 9/00* (2006.01)

(52) U.S. Cl.
USPC .................................. 322/24; 322/44; 322/59

(58) Field of Classification Search
USPC .............. 322/28, 24, 20, 44, 89, 59; 307/10.1
See application file for complete search history.

(56) References Cited

U.S. PATENT DOCUMENTS

| | | | |
|---|---|---|---|
| 4,636,706 A | | 1/1987 | Bowman et al. |
| 5,319,299 A | | 6/1994 | Maehara |
| 6,121,757 A | * | 9/2000 | Takahashi et al. ............... 322/28 |
| 6,424,127 B1 | * | 7/2002 | Ishii ................................. 322/36 |
| 6,552,515 B2 | * | 4/2003 | Shimizu et al. .................. 322/28 |
| 7,224,144 B2 | * | 5/2007 | Inokuchi et al. ................. 322/24 |
| 7,224,148 B2 | * | 5/2007 | Watanabe et al. ............... 322/59 |
| 7,276,817 B2 | * | 10/2007 | Sasaki et al. ................... 307/153 |
| 7,285,938 B2 | * | 10/2007 | Aoyama .......................... 322/28 |
| 7,304,455 B2 | * | 12/2007 | Okahara et al. ................. 322/28 |
| 7,368,892 B2 | * | 5/2008 | Uematsu et al. ................. 322/27 |
| 7,531,992 B2 | * | 5/2009 | Inokuchi et al. ................. 322/28 |
| 7,683,588 B2 | * | 3/2010 | Maehara .......................... 322/28 |
| 8,164,313 B2 | * | 4/2012 | Maehara .......................... 322/59 |
| 2007/0114976 A1 | * | 5/2007 | Inokuchi et al. ................. 322/28 |
| 2009/0224600 A1 | | 9/2009 | Kizawa et al. |

FOREIGN PATENT DOCUMENTS

| | | |
|---|---|---|
| JP | 62-064299 A | 3/1987 |
| JP | 03-118800 A | 5/1991 |
| JP | 07-194023 A | 7/1995 |
| JP | 2001-197796 A | 7/2001 |
| JP | 2009-219207 A | 9/2009 |

\* cited by examiner

*Primary Examiner* — Tulsidas C Patel
*Assistant Examiner* — Viet Nguyen
(74) *Attorney, Agent, or Firm* — Sughrue Mion, PLLC

(57) ABSTRACT

In a control device for a vehicle AC generator, a voltage control includes target voltage adjusting means for adjusting a target voltage value in response to a target change command from an external control unit and a gradual excitation control circuit that controls an excitation duty to increase according to an excitation duty control characteristic when a vehicle load increases and when the target voltage adjusting means varies the target voltage value to a lower value. The gradual excitation control circuit includes duty characteristic varying means for varying the excitation duty control characteristic. The duty characteristic varying means varies a rate of increase of the excitation duty in a predetermined region of the excitation duty control characteristic in comparison with its other region.

12 Claims, 12 Drawing Sheets

CONTROL DEVICE FOR VEHICLE AC GENERATOR

CROSS REFERENCE TO RELATED APPLICATION

This application is a National Stage of International Application No. PCT/JP2009/069717 filed Nov. 20, 2009, the contents of all of which are incorporated herein by reference in their entirety.

TECHNICAL FIELD

The present invention relates to a control device for a vehicle AC generator mounted on a vehicle, such as an automobile, to feed an in-vehicle battery and a vehicle load.

BACKGROUND ART

Generally, a vehicle AC generator is provided with a voltage control unit and the voltage control unit controls an output voltage of the vehicle AC generator to take a target voltage value. In many cases, the voltage control unit is configured to control an output voltage of the vehicle AC generator to take a target voltage value by repetitively giving a control cycle to a power switch element that controls an exciting current flowing through a field coil of the vehicle AC generator and adjusting an excitation duty indicating an ON time ratio of the power switch element in each control cycle.

JP62-64299A discloses gradual excitation control by which an exciting current of a vehicle AC generator is increased gradually with time to suppress an abrupt increase of a drive torque of the vehicle AC generator when a vehicle load is newly activated. Also, JP7-194023A discloses external control by which a target change command for an output voltage of the vehicle AC generator is given to the voltage control unit from an external control unit thereof, so that the voltage control unit adjusts the target voltage value for an output voltage of the vehicle AC generator in response to this target change command with the aim of controlling an output voltage of the vehicle AC generator to take an appropriate value according to an operation state of the vehicle.

PRIOR ART DOCUMENTS

Patent Documents

Patent Document 1: JP62-64299A
Patent Document 2: JP7-194023A

SUMMARY OF THE INVENTION

With a control device for a vehicle AC generator in which the gradual excitation control and the external control are set in the voltage control unit, for example, in a case where a target change command to change the target voltage value from a high voltage value to a low voltage value is given from the external control unit, a battery voltage of the in-vehicle battery does not drop for a certain time when the vehicle load is small. The vehicle AC generator therefore does not have to generate power. Hence, an excitation duty to start load response control drops substantially to 0% and the load response control is started only after the battery voltage drops to the extent that the vehicle AC generator has to generate power. As a result, an event that an output voltage of the vehicle AC generator drops far below the target voltage value known as undershoot occurs, and there arises a defect that gives a feeling of discomfort, for example, noticeable variance in illumination by the vehicle lights.

The invention proposes a control device for a vehicle AC generator capable of overcoming such a defect.

Means for Solving the Problems

A control device for a vehicle AC generator according to the invention is a control device for a vehicle AC generator that feeds an in-vehicle battery and a vehicle load by rectifying an AC output of the vehicle AC generator. The control device includes a voltage control unit that repetitively gives a control cycle to a power switch element controlling an exciting current flowing through a field coil of the vehicle AC generator and controls an output voltage of the vehicle AC generator to take a target voltage value by adjusting an excitation duty indicating an ON time ratio of the power switch element in each control cycle. In the control device according to the invention, the voltage control unit includes target voltage adjusting means for adjusting the target voltage value in response to a target change command from an external control unit and a gradual excitation control circuit that controls the excitation duty to increase according to an excitation duty control characteristic when the vehicle load increases and when the target voltage adjusting means varies the target voltage value to a lower value. Also, the gradual excitation control circuit includes duty characteristic varying means for varying the excitation duty control characteristic. Further, the duty characteristic varying means varies a rate of increase of the excitation duty in a predetermined region of the excitation duty control characteristic in comparison with other region of the excitation duty control characteristic.

Advantage of the Invention

According to the control device for the vehicle AC generator of the invention, the voltage control unit includes the target voltage adjusting means for adjusting the target voltage value in response to the target change command from the external control unit and the gradual excitation control circuit that controls the excitation duty to increase according to the excitation duty control characteristic when the vehicle load increases and when the target voltage adjusting means varies the target voltage value to a lower value. Also, the gradual excitation control circuit includes the duty characteristic varying means for varying the excitation duty control characteristic. Further, the duty characteristic varying means varies a rate of increase of the excitation duty in the predetermined region of the excitation duty control characteristic in comparison with the other region of the excitation duty control characteristic. Hence, even in a case where the target change command to change the target voltage value from a high voltage value to a low voltage value is given from the external control unit, for example, when the vehicle load is small, it becomes possible to suppress undershoot, that is, dropping of an output voltage of the vehicle AC generator below the target voltage value. Hence, a feeling of discomfort arising, for example, from noticeable variance in illumination by the vehicle lights, can be eliminated.

MODES FOR CARRYING OUT THE INVENTION

Hereinafter, embodiments of a control device for a vehicle AC generator according to the invention will be described with reference to the drawings.

First Embodiment

Figure 1:
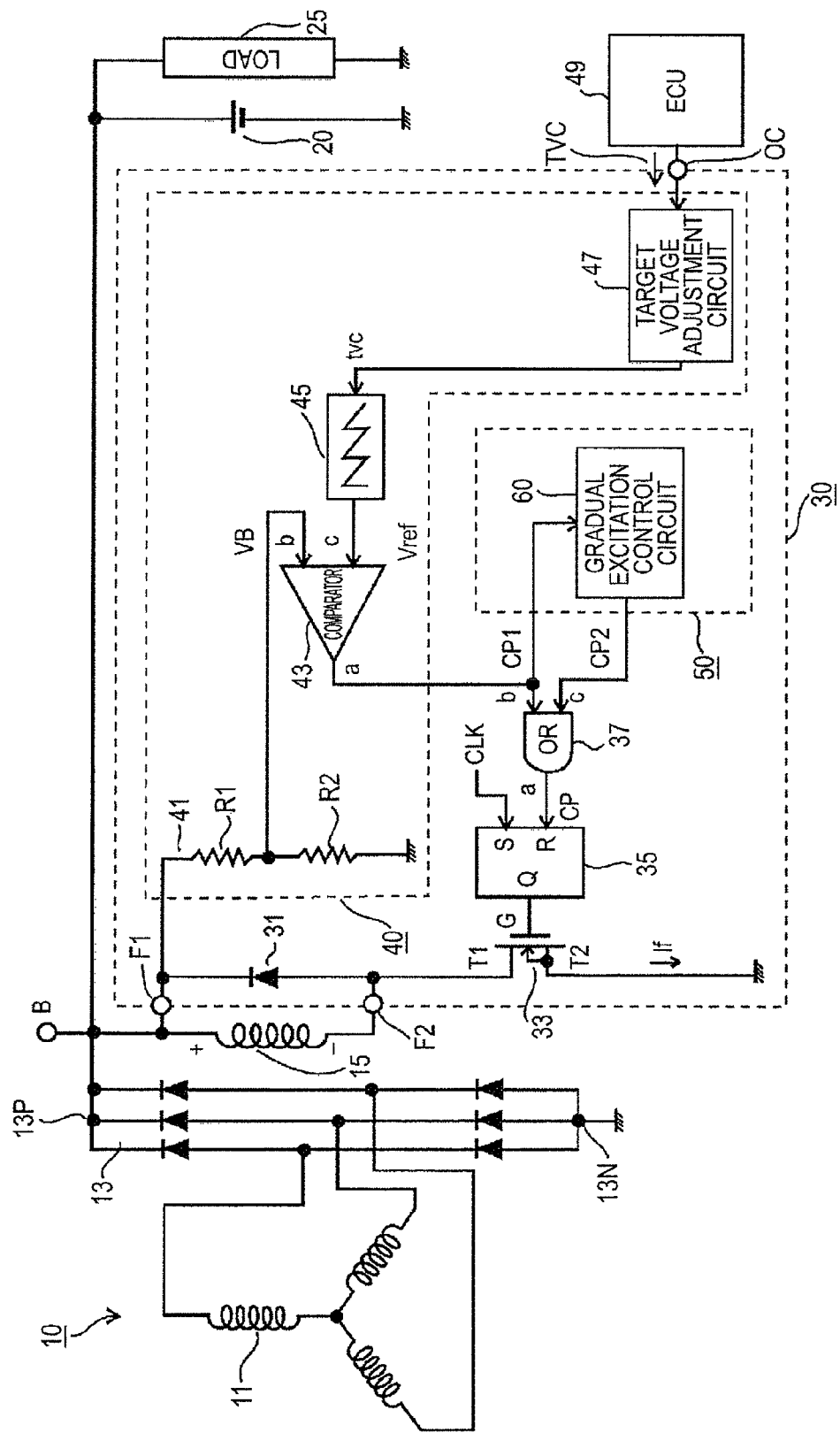
FIG. 1 is an electric circuit diagram showing a first embodiment of a control device for a vehicle AC generator according to the invention.

FIG. 1 is an electric circuit diagram showing a first embodiment of a control device for a vehicle AC generator according to the invention.

(1) Overall Configuration of First Embodiment

A control device for a vehicle AC generator of the first embodiment is used together with a vehicle AC generator 10, an in-vehicle battery 20, and a vehicle load 25, and includes a voltage control unit 30. The AC generator 10 has a three-phase generating coil 11, a three-phase rectifier circuit 13, and a field coil 15. The AC generator 10 is formed by disposing the field coil 15 on a rotor driven by a vehicle driving engine and disposing the three-phase generating coil 11 on a stator fixed around the rotor. The three-phase generating coil 11 is connected in a star shape and generates a three-phase AC voltage according to an exciting current If flowing through the field coil 15. The three-phase rectifier circuit 13 is formed as a three-phase full-wave rectifier circuit and connected to the three-phase generating coil 11. The three-phase rectifier circuit 13 rectifies the three-phase AC voltage generated in the three-phase generating coil 11 and generates a generator output voltage between a plus-end output terminal 13P and a minus-end output terminal 13N.

The plus-end output terminal 13P of the three-phase rectifier circuit 13 is connected directly to a plus terminal of the in-vehicle battery 20. The minus-end output terminal 13N is grounded to a reference potential point, for example, the vehicle body. A minus terminal of the in-vehicle battery 20 is connected to the reference potential point. A vehicle load 25 includes electric loads of various types in the vehicle and includes more than one electric load. The respective electric loads are connected in parallel to the in-vehicle battery 20 via switches. The AC generator 10 feeds electric power to the in-vehicle battery 20 and the vehicle load 25 from the three-phase rectifier circuit 13. The in-vehicle battery 20 is charged by the generator output voltage of the AC generator 10 and the vehicle load 25 is fed by the AC generator 10 and the in-vehicle battery 20. A terminal B is a battery terminal connected to the plus terminal of the in-vehicle battery 20 and also connected to the plus-end output terminal 13P of the three-phase rectifier circuit 13.

A plus terminal of the field coil 15 is connected directly to the battery terminal B and a minus terminal of the field coil 15 is connected to the reference potential point via the voltage control unit 30. The field coil 15 is excited by the AC generator 10 and the in-vehicle battery 20, and the exciting current If flowing through the field coil 15 is controlled to be ON or OFF by the voltage control unit 30.

The voltage control unit 30 controls the three-phase AC voltage generated in the three-phase generating coil 11 by controlling the exciting current If to be ON or OFF and thereby controls the generator output voltage outputted from the three-phase rectifier circuit 13. The voltage control unit 30 has field terminals F1 and F2 and an external control terminal OC and also has a flywheel diode 31, a power switch element 33, an SR flip-flop 35, an OR circuit 37, a first control pulse generation circuit 40, and a second control pulse generation circuit 50 inside.

The field terminals F1 and F2 of the voltage control unit 30 are connected directly to the plus terminal and the minus terminal of the field coil 15, respectively. The external control terminal OC is connected to an external control unit, more specifically, an electronic control unit (ECU) 49 provided on the outside of the voltage control unit 30. The electronic control unit 49 is a micro-computer that performs control of various types for the vehicle driving engine, for example, ignition control, intake control, and fuel injection control. The flywheel diode 31 absorbs a transient voltage generated in the field coil 15 and is connected to the field terminals F1 and F2 and thereby connected to the field coil 15 in parallel.

The power switch element 33 controls the exciting current If flowing through the field coil 15 to be ON or OFF. The power switch element 33 is formed of a power semiconductor device, such as a power MOSFET and a power IGBT and has a pair of main terminals T1 and T2 and a control terminal G. The main terminal T1 is connected to the field terminal F2 and the main terminal T2 is grounded to the reference potential point. The power switch element 33 is switched into ON state when the control terminal G shifts to a high level to flow the exciting current If between the main terminals T1 and T2, and switched into OFF state when the control terminal G shifts to a low level to shut off the exciting current If flowing between the main terminals T1 and T2.

The SR flip-flop 35 has an output Q, a set input S, and a reset input R. The output Q is connected to the control terminal G of the power switch element 33 and controls the control terminal G to shift to the high level or the low level so that the power switch element 33 is switched into ON or OFF state. A reference lock pulse CLK is inputted into the set input S. A control pulse CP is inputted into the reset input R. Each time the reference clock pulse CLK is inputted therein, the SR flip-flop 35 shifts an output signal at the output Q to the high level and brings the power switch element 33 into the ON state. The ON state of the power switch element 33 continues until the control pulse CP inputted into the reset input R rises to a high level.

The reference clock pulse CLK is inputted repetitively in a predetermined period T and a control cycle CC is given between every two adjacent reference clock pulses CLK. A time length of each control cycle CC is equal to the period T.

A repeating frequency of the reference clock pulse CLK is set specifically, for example, to 100 to 200 (Hz). Because each cyclic period of the reference clock pulse CLK is always constant at the predetermined period T, the time length T of each control cycle CC is always the same time length T. The control pulse CP determines an ON time Ton of the power switch element 33 in each control cycle CC. A ratio of the ON time Ton with respect to the time length T in each control cycle CC, Ton/T, is an ON time ratio and referred to as an excitation duty DUTY for the exciting current If.

The OR circuit 37 has an output a and a pair of inputs b and c, and generates the control pulse CP at the output a. The output a of the OR circuit 37 is connected to the reset input R of the SR flip-flop 35 so that the control pulse CP is supplied to the reset input R of the SR flip-flop 35. The first control pulse generation circuit 40 is connected to the input b of the OR circuit 37. The first control pulse generation circuit 40 generates a first control pulse CP1 and supplies the first control pulse CP1 to the input b of the OR circuit 37. The first control pulse CP1 is generated in each control cycle CC. The second control pulse generation circuit 50 is connected to the input c of the OR circuit 37. When the vehicle driving engine is in an idling operation state, the second control pulse generation circuit 50 generates a second control pulse CP2 in each control cycle CC and supplies the second control pulse CP2 to the input c of the OR circuit 37. The control pulse CP is either one of the first control pulse CP1 and the second control pulse CP2. Either one of the control pulses CP1 and CP2 whichever rises at earlier timing switches OFF the power switch element 33.

The first control pulse generation circuit 40 includes a battery voltage detection circuit 41, a comparator 43, a target voltage generation circuit 45, and a target voltage adjustment circuit 47. The battery voltage detection circuit 41 is a circuit that detects a battery voltage value VB. One end of the battery voltage detection circuit 41 is connected to the battery terminal B via the field terminal F1, and the other end thereof is grounded to the reference potential point. The battery voltage detection circuit 41 has voltage-dividing resistors R1 and R2 connected in series and outputs the battery voltage value VB from a connection point of the voltage-dividing resistors R1 and R2. The battery voltage value VB is a signal indicating a voltage of the in-vehicle battery 20 and the generator output voltage outputted from the three-phase rectifier circuit 13. The battery voltage value VB varies with a fluctuation of the vehicle load 25 and is adjusted by the control of the excitation duty DUTY for the exciting current If.

The target voltage generation circuit 45 generates a target voltage VREF. The target voltage VREF is a saw-tooth wave signal that varies, for example, in the same cyclic period as the predetermined cycle T. The target voltage VREF has a target voltage value Vref. The target voltage value Vref is a signal that rises at the same timing as the reference clock pulse CLK in synchronization with the reference clock pulse CLK and whose level drops linearly until the following reference clock pulse CLK. The amplitude of the target voltage value Vref is, for example, 1 (V). The target voltage value Vref of the target voltage VREF varies in the shape of saw teeth and therefore has no certain voltage value. To indicate the magnitude of the target voltage value Vref conceptually, a mean voltage of the target voltage value Vref in each control cycle CC is used. The mean voltage of the target voltage value Vref in each control cycles CC is equal to the target voltage value Vref just at the middle timing of the control cycle CC.

The target voltage adjustment circuit 47 is connected between the external control terminal OC of the voltage control unit 30 and the target voltage generation circuit 45. A target change command TVC is supplied to the external control terminal OC from the external control unit (ECU) 49. The target change command TVC from the external control unit 49 is received at the target voltage adjustment circuit 47. The target voltage adjustment circuit 47 supplies a target voltage command tvc to the target voltage generation circuit 45 in response to the target change command TVC from the external control unit 49. The target voltage command tvc adjusts the magnitude of the mean voltage of the target voltage value Vref by adjusting the magnitude of a bias value for the target voltage value Vref. For example, in a case where the target voltage value Vref is changed from a target voltage value with a high mean voltage to a target voltage value with a low mean voltage by the external control unit 49, the target voltage command tvc that makes the bias value for the target voltage value Vref smaller is given. The target voltage command tvc increases or decreases the mean voltage of the target voltage value Vref by adjusting the magnitude of the bias value for the target voltage value Vref. The target voltage command tvc adjusts the mean voltage of the target voltage Vref by adjusting the bias value for the target voltage value Vref, for example, in a range from 0 to 2 (V).

The comparator 43 has an output a and a pair of inputs b and c. The output a of the comparator 43 is connected to the input b of the OR circuit 37 so that the first control pulse CP1 is supplied to the input b of the OR circuit 37. The battery voltage value VB is supplied to the input b of the comparator 43 from the battery voltage detection circuit 41. The target voltage value Vref is supplied to the input c of the comparator 43 from the target voltage generation circuit 45. The comparator 43 compares the battery voltage value VB with the target voltage value Vref. When the battery voltage value VB exceeds the target voltage value Vref in each control cycle CC, the first control pulse CP1 is raised to a high level. Let t1 be the rising timing of the first control pulse CP1. The first control pulse CP1 is maintained at the high level from the rising timing t1 to the end timing of the control cycle CC.

The second control pulse generation circuit 50 includes a gradual excitation control circuit 60. The first control pulse CP1 is supplied to the gradual excitation control circuit 60. When the vehicle driving engine is in the idling operation state, the gradual excitation control circuit 60 generates the second control pulse CP2 upon receipt of the first control pulse CP1. The second control pulse CP2 is supplied to the input c of the OR circuit 37. The second control pulse CP2 is generated in each control cycle CC. Let t2 be the rising timing of the second control pulse CP2. The second control pulse CP2 is maintained at a high level from the rising timing t2 to the end timing of the control cycle CC. The rising timing t2 is controlled to come earlier or later than the rising timing t1. The first and second control pulses CP1 and CP2 are inputted into the OR circuit 37. Either one of the control pulses CP1 and CP2 whichever rises at the earlier timing switches off the power switch element 33. Either one of the first control pulse CP1 and the second control pulse CP2 determines the excitation duty DUTY by determining an ON time Ton of the power switch element 33.

(2) Configuration of Gradual Excitation Control Circuit 60

Figure 2:
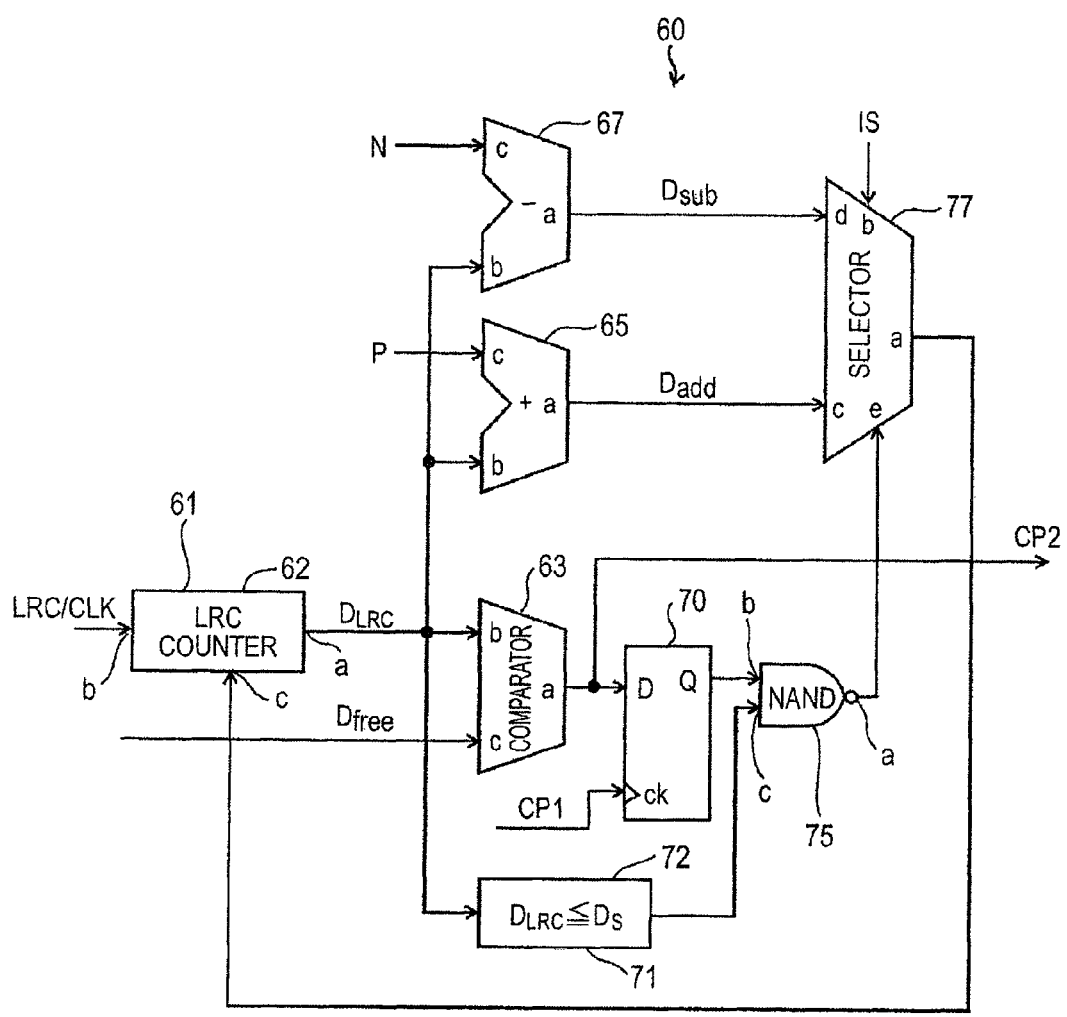
FIG. 2 is a block diagram showing a gradual excitation control circuit in the first embodiment.

FIG. 2 is a block diagram showing the gradual excitation control circuit 60 in the first embodiment. The gradual excitation control circuit 60 includes a load response control counter 61, a comparator 63, an adder 65, a subtractor 67, a D flip-flop 70, a determination part 71, a NAND circuit 75, and a selector 77.

The load response control counter 61 forms load response control means 62. The load response control means 62 is used to generate the second control pulse CP2 in each control cycle CC and controls the rising timing t2 of the second control pulse CP2 in each control cycle CC in response to a fluctuation of the vehicle load 25.

The load response control counter 61 is a binary counter made up of plural bits. The load response control counter 61 has an output a, an input b, and a count value control input c. A load response control clock LRC/CLK is given to the input b of the load response control counter 61. The load response control counter 61 counts the load response control clock LRC/CLK and generates a load response control count value DLRC at the output a. The load response control clock LRC/CLK has a repetition frequency ten or more times higher than that of the reference clock pulse CLK, for example, a repetition frequency 16 times higher than the repetition frequency of the reference clock pulse CLK. At the start timing of each control cycle CC, the load response control count value DLRC is a zero count value, that is, all the bits exhibit a value 0. The load response control clock LRC/CLK is sequentially counted up from the zero count value. The load response control count value DLRC is used to generate the second control pulse CP2, and the rising timing t2 of the second control pulse CP2 in each control cycle CC is controlled with a variance of the load response control count value DLRC.

The comparator 63 has an output a and a pair of inputs b and c. The second control pulse CP2 is outputted from the output a of the comparator 63. The load response control count value DLRC is inputted into the input b of the comparator 63 from the load response control counter 61. A free running count value Dfree is inputted into the input c of the comparator 63. The free running count value Dfree is a binary count value having the same number of bits as the load response control count value DLRC. The free running count value Dfree is a count value which sequentially counted up the load response control clock LRC/CLK from the start timing to the end timing of each control cycle CC. At the start timing of each control cycle CC, the free running count value Dfree is a zero count value, that is, all the bits exhibit a value 0. The free running count value Dfree is sequentially counted up from the zero count value and becomes a full count value, that is, all the bits exhibit 1, at the end timing of each control cycle CC. In each control cycle CC, timing at which the load response control count value DLRC and the free running count value Dfree coincide with each other is the rising timing t2 of the second control pulse CP2. The comparator 63 raises the second control pulse CP2 outputted from the output a to a high level in each control cycle CC at the timing at which the load response control count value DLRC and the free running count value Dfree coincide with each other.

The adder 65 has an output a and two inputs b and c. The load response control count value DLRC outputted from the load response control counter 61 is inputted into the input b of the adder 65. A predetermined additional value P is inputted into the input c of the adder 65. The adder 65 outputs an addition output Dadd obtained by adding the additional value P to the load response control count value DLRC. The subtractor 67 has an output a and two inputs b and c. The load response control count value DLRC outputted from the load response control counter 61 is inputted into the input b of the subtractor 67. A predetermined subtraction value N is inputted into the input c of the subtractor 67. The subtractor 67 outputs a subtraction output Dsub obtained by subtracting the subtraction value N from the load response control count value DLRC.

The D flip-flop 70 has an input D, a clock input ck, and an output Q. The second control pulse CP2 outputted from the comparator 63 is given to the input D. The first control pulse CP1 is given to the clock input ck. The D flip-flop 70 changes a level of the output Q according to a relation in which either one of the rising timing t1 of the first control pulse CP1 and the rising timing t2 of the second control pulse CP2 comes earlier in each control cycle CC. The rising timing t1 of the first control pulse CP1 is an operation timing of the D flip-flop 70.

A case where the rising timing t2 of the second control pulse CP2 comes earlier than the rising timing t1 of the first control pulse CP1 is referred to as a t2 preceding case. Conversely, a case where the rising timing t2 of the second control pulse CP2 comes later than the rising timing t1 of the first control pulse CP1 and the rising timing t1 comes earlier than the rising timing t2 is referred to as a t1 preceding case. In the t2 preceding case, at the operation timing t1 of the D flip-flop 70, the input D is set to a high level and the output Q is set to a high level. In the t1 preceding case, at the operation timing t1 of the D flip-flop 70, the input D is set to a low level and the output Q is set to a low level.

The load response control count value DLRC outputted from the load response control counter 61 is inputted into the determination part 71. The determination part 71 compares the load response control count value DLRC with a predetermined count value Ds and determines whether the load response control count value DLRC is equal to or smaller than the predetermined count value Ds. When the load response control count value DLRC is equal to or smaller than the predetermined count value Ds, an output of the determination part 71 is set to a high level. When the load response control count value DLRC is larger than the predetermined count value Ds, the output of the determination part 71 is set to a low level.

The determination part 71 forms duty characteristic varying means 72. Assume that a state where the output of the determination part 71 is set to the low level, that is, a state where the load response control count value DLRC is larger than the predetermined count value Ds is a normal state NC, whereas a state where the output of the determination part 71 is set to the high level, that is, a state where the load response control count value DLRC is equal to or smaller than the predetermined count value Ds is a specific state SC. The duty characteristic varying means 72 varies a control characteristic of the excitation duty DUTY in the specific state SC in comparing with a control characteristic of the excitation duty DUTY in the normal state NC.

The NAND circuit 75 has an output a and two inputs b and c. The input b of the NAND circuit 75 is connected to the output Q of the D flip-flop 70 and the input c is connected to the output of the determination part 71. In a state where the output of the determination part 71 is at the low level, that is, in the normal state NC, the NAND circuit 75 inverts the output Q of the D flip-flop 70 and outputs the result from the output a. In the normal state NC, the output of the NAND circuit 75 is set to a high level in the t1 preceding case, that is, in the case where the rising timing t2 comes later than the rising timing t1, and to a low level in the t2 preceding case, that is, in the case where the rising timing t2 comes earlier than the rising timing t1. The output of the NAND circuit 75 is set to the low level in the specific state SC in which the output of the determination part 71 is set to the high level.

The selector 77 has an output a and inputs b, c, d, and e. An idling operation signal IS indicating that the vehicle driving engine is in the idling operation state is given to the input b of the selector 77. The idling operation signal IS is set to a low level when the engine speed is equal to or lower than the idling speed and set to a high level when the engine speed exceeds the idling speed. The output a of the selector 77 is connected to the count value control input c of the load response control counter 61. When the idling operation signal IS is set to the high level, the load response control count value DLRC of the load response control counter 61 is controlled to forcedly take the full count value. As a result, the load response control counter 61 performs load response control by counting the load response control clock LRC/CLK when the vehicle driving engine is in the idling operation state and the idling operation signal IS is set to the low level.

The input c of the selector 77 is connected to the output a of the adder 65 and the addition output Dadd is inputted into the input c of the selector 77. The input d of the selector 77 is connected to the output a of the subtractor 67 and the subtraction output Dsub is inputted into the input d of the selector 77. The input e of the selector 77 is connected to the output a of the NAND circuit 75. The output a of the NAND circuit 75 is used as a selecting signal to select either one of the addition output Dadd and the subtraction output Dsub.

(3) Excitation Duty Control Characteristic by Voltage Control Unit 30

Figure 3:
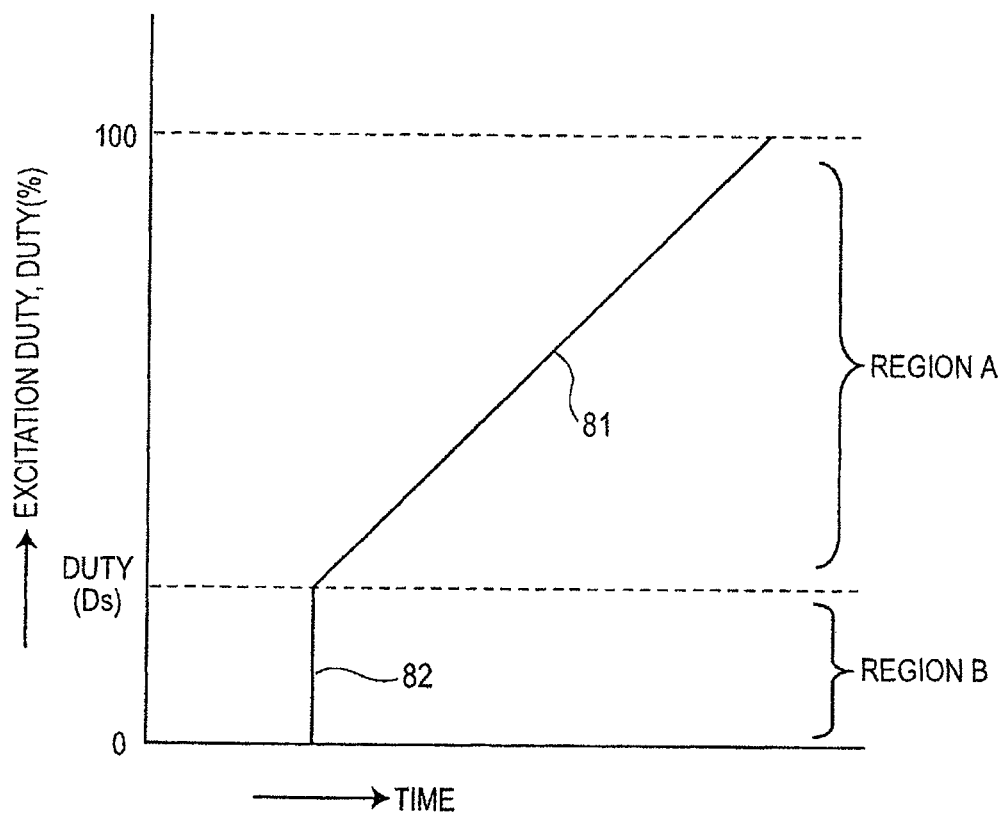
FIG. 3 is a characteristic view showing an excitation duty control characteristic by the first embodiment.

FIG. 3 shows an excitation duty control characteristic by the voltage control unit 30. The excitation duty control characteristic indicates a characteristic of the excitation duty DUTY when it increases from 0(%) to 100(%) with time. In FIG. 3, the ordinate is used for the excitation duty DUTY (%) and the abscissa is used for a time axis. The excitation duty control characteristic of FIG. 3 includes two regions A and B. The boundary between the region A and the region B is a predetermined duty value DUTY(Ds). The predetermined duty value DUTY(Ds) is set, for example, to 10 to 30(%), more specifically, to 25(%) according to the predetermined count value Ds used in the determination part 71. The region A is a region corresponding to the excitation duty DUTY exceeding the predetermined duty value DUTY(Ds), that is the excitation duty DUTY between the predetermined duty value DUTY(Ds) and 100(%). The region A corresponds to the normal state NC, that is, the state where the determination part 71 outputs the low-level output. In the region A, in a case where the excitation duty DUTY increases with time, the excitation duty DUTY linearly increases along a straight line 81 inclined with respect to the time axis from the predetermined duty value DUTY(Ds) toward 100(%).

The region B is a region corresponding to the excitation duty DUTY at or below the predetermined duty value DUTY (Ds), that is, the excitation duty DUTY between the predetermined duty value DUTY(Ds) and 0(%). The region B corresponds to the specific state SC, that is, the state where the determination part 71 outputs the high-level output. In the region B, the excitation duty DUTY increases abruptly along a straight line perpendicular to the time axis from 0(%) toward the predetermined duty value DUTY(Ds).

(4) Control Operation of Excitation Duty DUTY in Normal state NC

Figure 4:
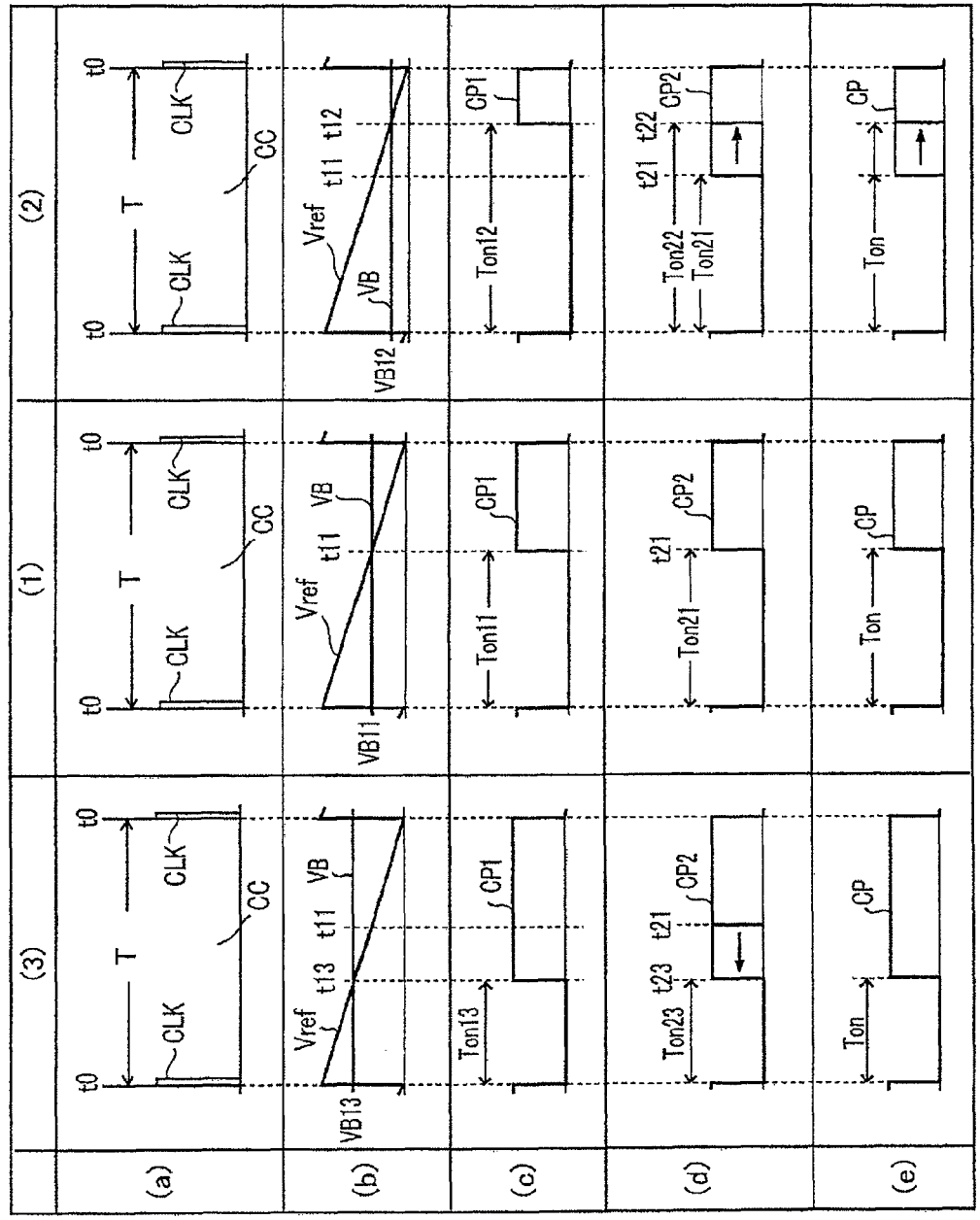
FIG. 4 is an explanatory view for explaining a control operation by a voltage control unit in the first embodiment.

FIG. 4 is an explanatory view for explaining a control operation by the voltage control unit 30 in the normal state NC, that is, the state where the output of the determination part 71 is at the low level.

When the output of the determination part 71 is at the low level, the NAND circuit 75 inverts the output Q of the D flip-flop 70 and supplies the result to the input e of the selector 77. The output Q of the D flip-flop 70 is the high-level output in the t2 preceding case, that is, in the case where the rising timing t2 comes earlier than the rising timing t1. However, this high-level output is inverted to the low level in the NAND circuit 75. Also, the output Q of the D flip-flop 70 is the low-level output in the t1 preceding case, that is, in the case where the rising timing t2 comes later than the rising timing t1. However, this low-level output is inverted to the high level in the NAND circuit 75.

In the t2 preceding case, that is, in a case where the input e is set to a low level, the selector 77 selects the addition output Dadd and supplies the addition output Dadd to the count value control input c of the load response control counter 61. In the t1 preceding case, that is, in a case where the input e is set to a high level, the selector 77 selects the subtraction output Dsub and supplies the subtraction output Dsub to the count value control input c of the load response control counter 61. The excitation duty DUTY is controlled by either one of the addition output Dadd and the subtraction output Dsub.

In each control cycle CC in which the state is defined as the t2 preceding case, the addition output Dadd is supplied to the count value control input c of the load response control counter 61 and the load response control counter 61 controls the load response control count value DLRC to be forcedly set to the addition output Dadd. The addition output Dadd is obtained by adding the additional value P to the load response control count value DLRC. In each control cycle CC in which the addition output Dadd is supplied, the load response control counter value DLRC is counted up by the additional value P. Accordingly, the rising timing t2 of the second control pulse CP2 is delayed by a time comparable to the additional value P and the excitation duty DUTY increases.

In each control cycle CC in which the state is defined as the t1 preceding case, the load response control counter 61 controls the load response control count value DLRC to be forcedly set to the subtraction output Dsub. The subtraction output Dsub is obtained by subtracting the subtraction value N from the load response control count value DLRC. In each control cycle CC in which the subtraction output Dsub is supplied, the load response control count value DLRC is counted down by the subtraction value N. Accordingly, the rising timing t2 of the second control pulse CP2 is advanced by a time comparable to the subtraction value N and the excitation duty DUTY decreases.

Column (1) of FIG. 4 shows a given control state and Columns (2) and (3) show control states varied from the control state of Column (1) by way of example. The control state of Column (2) is a control state where the excitation duty DUTY increased from the control state of Column (1). The control state of Column (3) is a control state where the excitation duty DUTY decreased from the control state of Column (1). In respective Columns (1), (2), and (3), Row (a) shows two adjacent reference clock pulses CLK. Row (b) shows the target voltage value Vref and the battery voltage value VB corresponding to Row (a). Rows (c) and (d) respectively show the first and second control pulses CP1 and CP2 corresponding to the target voltage value Vref and the battery voltage VB. Row (e) shows an ON time Ton for the power switch element 33. The abscissas in Rows (a) through (e) are used for a common time axis.

In Row (a) in all the columns of FIG. 4, two adjacent reference clock pulses CLK are shown with the control cycle CC. At a reference timing t0 at which each reference clock pulse CLK shifts to a high level, the SR flip-flop 35 is set and the power switch element 33 is brought into an ON state. In Row (a) in all the columns of FIG. 4, only one control cycle CC is shown, it should be appreciated, however, that the control cycles CC are successively given in series according to repetitions of the reference clock pulse CLK. The control cycle CC is given between every two adjacent reference clock pulses CLK. The start timing and the end timing of the control cycle CC coincide with the reference timing t0.

In Row (c) in all the columns of FIG. 4, the first control pulse CP1 is shown in the control cycle CC shown in respective corresponding Rows (a). In Row (b) in all the columns, the target voltage value Vref and the battery voltage value VB corresponding to the first control pulse CP1 are shown. In all the columns of FIG. 4, it is assumed that the target voltage value Vref is unsusceptible to a change by the external control unit 49 and does not vary.

In Column (1), the rising timing t1 of the first control pulse CP1 is given as t11 and the rising timing t2 of the second control pulse CP2 is given as t21. Because the vehicle load 25 is stable, the rising timings t11 and t21 substantially coincide with each other. The battery voltage value VB is given as VB11. At the timing t11 at which the battery voltage value VB11 exceeds the target voltage value Vref, the first control pulse CP1 rises to the high level and the ON time Ton1 by the first control pulse CP1 is given as Ton11. In Column (1), the ON time Ton2 by the second control pulse CP2 is given as Ton21. In the state of Column (1), the ON time Ton of the power switch element 33 shown in Row (e) is determined by either one of the ON times Ton11 and Ton21 by the first and second control pulses CP1 and CP2, respectively.

In Column (2), the rising timing t1 of the first control pulse CP1 moves from t11 to t12 and the rising timing t2 of the second control pulse CP2 moves from t21 to t22. In Column (2), the battery voltage VB drops from VB11 to smaller VB12 according to an increase of the vehicle load 25 in the initial control cycle CC. As the battery voltage value VB drops to VB12, the rising timing t1 of the first control pulse CP1 moves from t11 to t12. The rising timing t1 of the first control pulse CP1 immediately moves from t11 to t12 in response to a drop of the battery voltage value VB to VB12.

On the contrary, the rising timing t2 of the second control pulse CP2 in the initial control cycle CC in Column (2) maintains, as is shown in Row (d) of Column (2), the same timing t21 as in Column (1). The initial control cycle CC in Column (2) is defined as the t2 preceding case because the rising timing t2 of the second control pulse CP2 is maintained at t21. As a result, in Column (2), the ON time Ton of the power switch element 33 shown in Row (e) is determined by the second control pulse CP2. In the initial control cycle CC in Column (2), the power switch element 33 is consequently switched OFF at the rising timing t21 of the second control pulse CP2, hence, the ON time Ton of the power switch element 33 takes the same value as the ON time Ton21 in Column (1).

Because the initial control cycle CC in Column (2) is defined as the t2 preceding case, the D flip-flop 70 of the gradual excitation control circuit 60 is brought into a state where the second control pulse CP2 has already risen to a high level at the rising timing t12 of the first control pulse CP1 inputted into the clock input ck. Hence, the output Q of the D flip-flop 70 is set to the high level. As a result, the selector 77 supplies the addition output Dadd to the count value control input c of the load response control counter 61 and the load response control count value DLRC is counted up to the addition value Dadd. This count-up operation to the addition value Dadd is performed repetitively in more than one control cycle CC. As a result, the rising timing t2 of the second control pulse CP2 that determines the ON time Ton of the power switch element 33 is delayed gradually from the rising timing t21, and as is shown in Row (d), the rising timing t2 moves eventually to t22 that substantially coincides with t12. Due to the movement of the rising timing t2, the ON time Ton2 by the second control pulse CP2 is increased gradually to Ton22. Accordingly, as is shown in Row (e), the ON time Ton of the power switch element 33 is increased gradually with an increase of Ton2, and the excitation duty DUTY of the power switch element 33 is increased gradually. The excitation duty DUTY in the region A of FIG. 3 is increased by a variance of the control condition from Column (1) to Column (2).

In Column (3), the rising timing t1 of the first control pulse CP1 moves from t11 to t13 and the rising timing t2 of the second control pulse CP2 moves from t21 to t23. In Column (3), in the initial control cycle CC, the battery voltage value VB rises from VB11 to a larger VB13 according to a decrease of the vehicle load 25. By an increase of the battery voltage value VB to VB13, the rising timing t1 of the first control pulse CP1 moves to t13 advanced from t11. The rising timing t1 of the first control pulse CP1 immediately moves from t11 to t13 in response to the rise of the battery voltage value VB to VB13.

Meanwhile, in the initial control cycle CC in Column (3), the rising timing t2 of the second control pulse CP2 maintains, as is shown in Row (d) of Column (3), the same timing t21 as in Column (1). Hence, the initial control cycle is defined as the t1 preceding case in Column (3). As a result, in Column (3), the ON time Ton of the power switch element 33 is determined by the rising timing t13 of the first control pulse CP1, from the initial control cycle CC as shown in Row (e). The ON time Ton of the power switch element 33 is therefore reduced to the ON time Ton13 by the first control pulse CP1, from the initial control cycle CC in Column (3). Likewise, the excitation duty DUTY of the power switch element 33 is made shorter.

Because the initial control cycle CC in Column (3) is defined as the t1 preceding case, the D flip-flop 70 of the gradual excitation control circuit 60 maintains the second control pulse CP2 at a low level at the rising timing t13. Hence, the output Q of the D flip-flop 70 is set to a low level. As a result, the selector 77 supplies the subtraction output Dsub to the count value control input c of the load response control counter 61 and the load response control counter value DLRC is counted down to the subtraction output Dsub. This count-down operation to the subtraction output Dsub is performed repetitively in more than one control cycle CC. As a result, the rising timing t2 of the second control pulse CP2 is advanced gradually from the rising timing t21 shown in Row (d) and eventually the rising timing t23 substantially coincides with t13.

(5) Control Operation of Excitation Duty DUTY in Specific State SC

In the specific state SC, because the load response control count value DLRC is equal to or smaller than the predetermined count value Ds, the output of the determination part 71 is set to the high level and the output a of the NAND circuit 75 is set to the low level. In the specific state SC, a t2 adjusting and holding operation to adjust and hold the rising timing t2 of the second control pulse CP2 to a predetermined value corresponding to the predetermined count value Ds is performed. The excitation duty DUTY is held at the predetermined duty value DUTY(Ds)) as is shown in the region B of FIG. 3.

In the specific state SC, because the determination part 71 outputs the high-level output, the selector 77 gives the addition output Dadd to the count value control input c of the load response control counter 61 in the control cycle CC and the load response control count value DLRC increases. Due to the increase of the load response control value DLRC, in the control cycle CC during which the load response control count value DLRC exceeds the predetermined count value Ds, the output of the determination part 71 is set to the low level. Hence, the selector 77 gives the subtraction output Dsub to the count value control input c of the load response control counter 61, and the load response control counter 61 then performs the subtraction operation and the load response control count value DLRC is decreased to the subtraction output Dsub. By the subtraction of the load response control value DLRC, when the output of the determination part 71 shifts to the high level in the following control cycle CC, the selector 77 again gives the addition output Dadd to the count value control input c of the load response control counter 61. Then, the load response control counter 61 performs the addition operation again and the load response control count value DLRC is increased by the addition output Dadd. As a result, the load response control counter 61 repetitively performs the subtraction operation and the addition operation alternately in the respective control cycles CC in series. Accordingly, the load response control count value DLRC is adjusted and held to the predetermined count value Ds and the rising timing t2 is adjusted and held to the timing corresponding to the predetermined count value Ds. Also, the excitation duty DUTY is adjusted and held to the predetermined duty value DUTY(Ds).

(6) Operation of Voltage Control Unit 30 by External Control Unit 49

Figure 5:
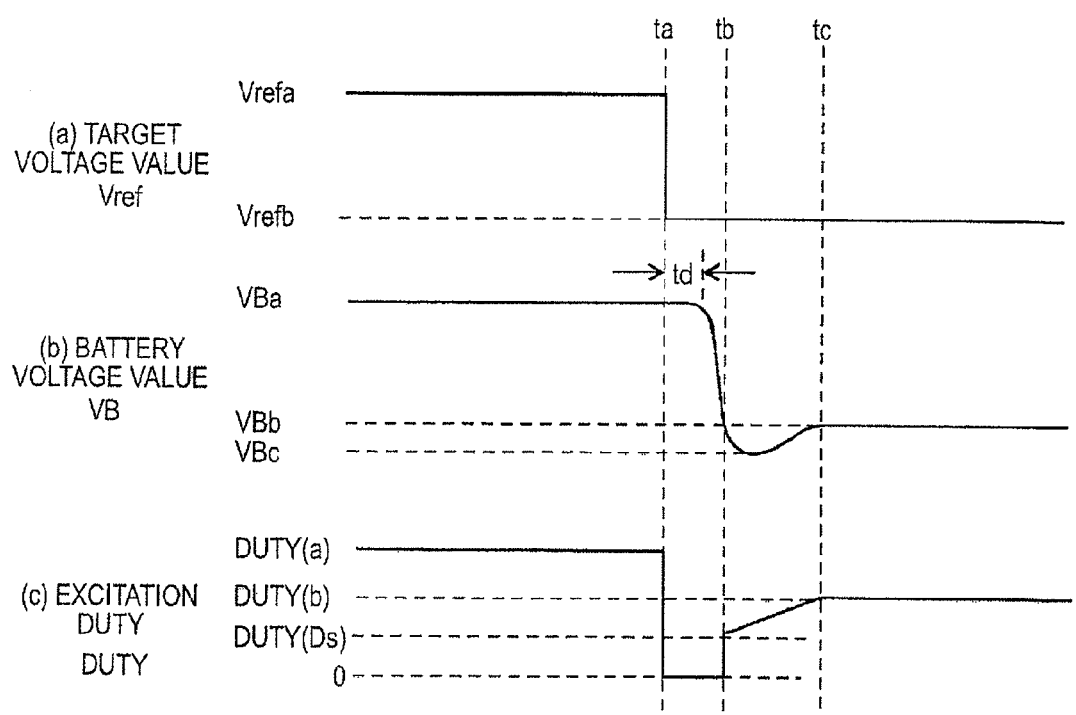
FIG. 5 is a timing chart for the first embodiment showing variances of a target voltage value, a battery voltage value, and an excitation duty in response to a target change command from an external control unit by way of example.
Figure 6:
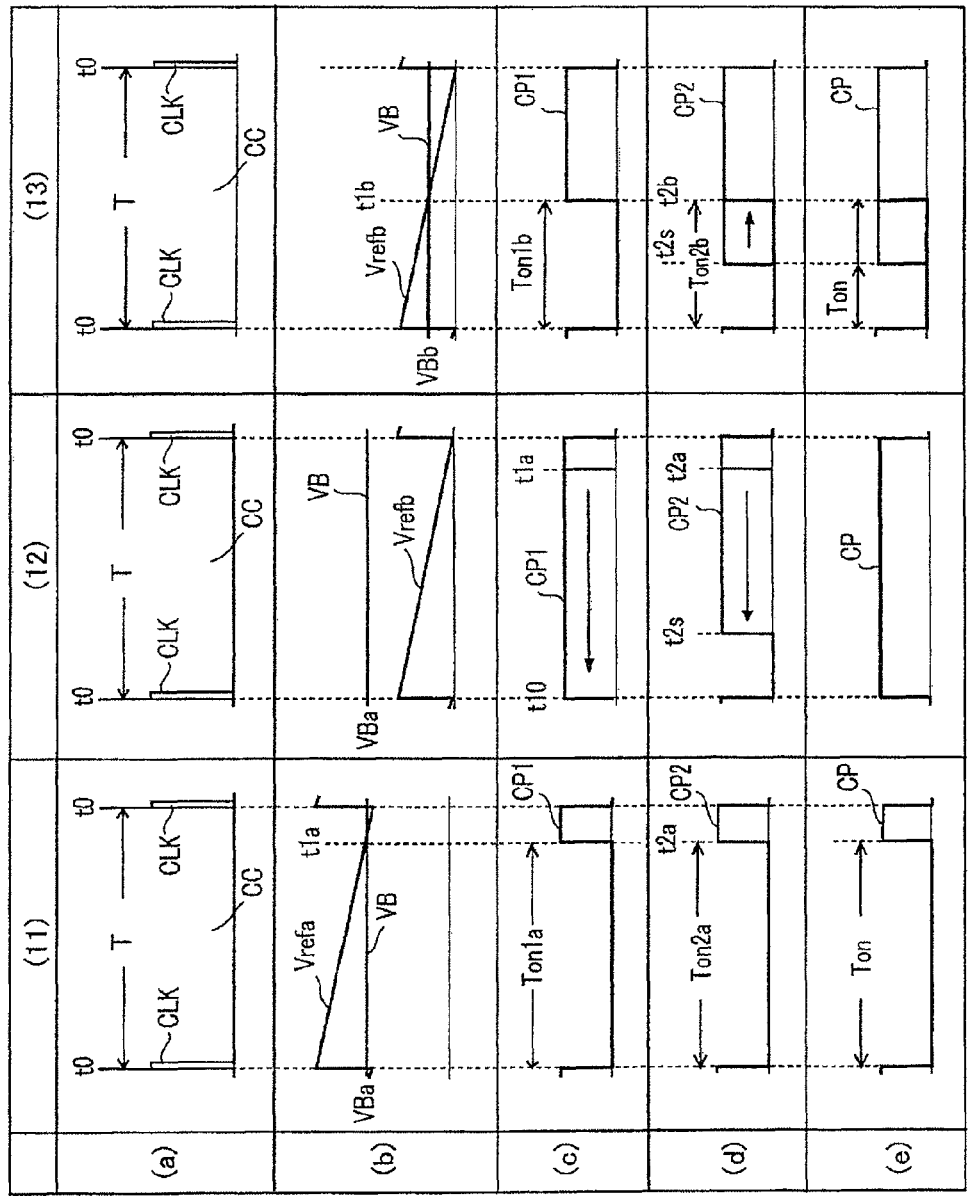
FIG. 6 is an explanatory view for explaining a control operation corresponding to FIG. 5.

With reference to FIG. 5 and FIG. 6, an explanation will be given to an operation of the voltage control unit 30 in a case where the external control unit 49 issues the target change command TVC to change the target voltage value Vref from the target voltage value Vrefa with the high mean voltage to the target voltage value Vrefb with the low mean voltage.

FIG. 5 is a timing chart showing variances of the target voltage value Vref, the battery voltage value VB, and the excitation duty DUTY in response to the target change command TVC by way of example. FIG. 5(a) shows the target voltage value Vref. FIG. 5(b) shows the battery voltage value VB. FIG. 5(c) shows the excitation duty DUTY. The abscissas in FIGS. 5(a), 5(b), and 5(c) are used for a common time axis. In FIG. 5, ta is a timing at which the target change command TVC is given from the external control unit 49, tc is a timing at which the battery voltage value VB settles at the low voltage value VBb corresponding to the target voltage value Vrefb with the low mean voltage in response to the target change command TVC, and tb is a timing at which the excitation duty DUTY rises from 0 between the timings ta and tc. FIG. 6 is an explanatory view for explaining a control operation corresponding to FIG. 5.

Column (11) of FIG. 6 shows a control state before the timing ta of FIG. 5 and shows a state where the voltage control unit 30 performs control to give a long ON time Ton by using the target voltage value Vrefa with the high mean voltage by way of example. Column (13) of FIG. 6 shows a control state at the timing tc of FIG. 5 and shows a state where the external control unit 49 issues the target change control TVC to change the target voltage value Vref from the target voltage value Vrefa with the high mean voltage to the target voltage value Vrefb with the low mean voltage, and the voltage control unit 30 performs control to give a shorter ON time Ton by using the target voltage value Vrefb in response to the target voltage command tvc corresponding to the target change command TVC by way of example. Column (12) shows a control state at a midpoint when the state in Column (11) shifts to the state in Column (13) and shows a state immediately after the timing ta of FIG. 5 by way of example.

In each of Columns (11) through (13) of FIG. 6, as in Row (a) of FIG. 4, Row (a) shows two adjacent reference clock pulses CLK. Row (b) shows the target voltage value Vref and the battery voltage value VB corresponding to Row (a). Rows (c) and (d) respectively show the first and second control pulses CP1 and CP2 corresponding to the target voltage value Vref and the battery voltage value VB. Row (e) shows an ON time Ton of the power switch element 33. The abscissas in Rows (a) through (e) are used for a common time axis.

Firstly, a state before the target change command TVC is issued will be described. This state is a state before the timing ta shown in FIG. 5 and the control state in this state is shown in Column (11) of FIG. 6 by way of example. In this control state, as is shown in FIG. 5(a), the target voltage value Vref is set to the target voltage value Vrefa with the high mean voltage. In response to the target voltage value Vrefa, the battery voltage value VB takes a high voltage value VBa as shown in FIG. 5(b). The excitation duty DUTY in this control state is DUTY(a) as is shown in FIG. 5(c).

In Column (11) of FIG. 6, as is shown in Row (b), the battery voltage value VB is given as VBa, the rising timing t1 of the first control pulse CP1 is given as t1a, and the rising timing t2 of the second control pulse CP2 is given as t2a. The rising timing t2a substantially coincides with t1a. The ON time Ton1 by the first control pulse CP1 is given as Ton1a and the ON time Ton2 by the second control pulse CP2 is given as Ton2a. In the control state of Column (11), the ON time Ton of the power switch element 33 shown in Row (e) is determined by the first control pulse CP1 or the second control pulse CP2 and the ON time Ton of the power switch element 33 is the ON time Ton1a or Ton2a.

The target change command TVC is issued at the timing ta shown in FIG. 5. In response to this target change command TVC, the target voltage value Vref is immediately changed to the target voltage value Vrefb with the low mean voltage at the timing ta. The control state immediately after the timing ta is shown in Column (12) of FIG. 6. In Column (12), the target voltage value Vref is changed in the initial control cycle CC from the target voltage value Vrefa with the high mean voltage to the target voltage value Vrefb with the low mean voltage by the external control unit 49. In response to the target change command TVC from the external control unit 49, the target voltage adjustment circuit 47 gives the target voltage command tvc to the target voltage generation circuit 45. Then, the target voltage generation circuit 45 lowers the mean voltage of the target voltage value Vref to change the target voltage value Vref from the target voltage value Vrefa with the high mean voltage to the target voltage value Vrefb with the low mean voltage.

However, the battery voltage VB does not fluctuate as soon as the target voltage value Vref is changed and therefore maintains the value VBa same as that in Column (11) even in the state of Column (12) of FIG. 6. Hence, in the state of Column (12), the target voltage value Vrefb and the battery voltage value VB do not intersect. In the state of Column (12), because the battery voltage value VBa is higher than the target voltage value Vrefb at the start timing t0 of the control cycle CC, the first control pulse CP1 rises to the high level at the start timing t0 of the control cycle CC and the rising timing t1 moves from t1a to t10. The rising timing t10 coincides with the reference timing t0 of the control cycle CC. Hence, as is shown in Row (c), the first control pulse CP1 stays at the high level from the reference timing t0 of the control cycle CC to the end timing thereof. In the state of Column (12), the ON time Ton of the power switch element 33 is determined by the first control pulse CP1 and the ON time Ton becomes 0. Further, as is shown in FIG. 5(c), the excitation duty becomes 0, too.

In association with the movement of the rising timing t1 of the first control pulse CP1 to t10, the rising timing t2 of the second control pulse CP2 follows the rising timing t10 in more than one subsequent control cycle CC and is therefore moved toward the rising timing t10. This control operation is defined as the t1 preceding case and the output Q of the D flip-flop 70 is set to the low level and the output of the NAND circuit 75 is set to the high level. Accordingly, the selector 77 outputs the subtraction output Dsub to the count value control input c of the load response control counter 61. Hence, the load response control count value DLRC is reduced to the subtraction output and the rising timing t2 is advanced.

As the rising timing t2 is advanced, the normal state NC shifts to the specific state SC. When the state changes to the specific state SC and the load response control count value DLRC drops to or below the predetermined count value Ds, the output of the determination part 71 shifts to the high level. Hence, the t2 adjusting and holding operation is performed, so that that rising timing t2 is adjusted and held to the timing t2s corresponding to the predetermined count value Ds in the subsequent control cycles CC. It should be noted, however, that the rising timing t2s is later than the rising timing t10 and, in the control state of Column (12), the ON time Ton of the power switch element 33 is determined by the rising timing t10 and thereby maintained at 0.

Because the excitation duty DUTY drops to 0 at the timing ta, as is shown in FIG. 5(b), the battery voltage value VB drops abruptly after a delay time td elapsed from the timing ta. As is shown in FIG. 5(b), the battery voltage value VB passes over the voltage value VBb corresponding to the target voltage value Vrefb once and undergoes undershoot, after which the battery voltage value VB eventually settles at the voltage value VBb corresponding to the target voltage value Vrefb at the timing tc.

As is shown in FIG. 5(b), the battery voltage VB drops abruptly between the timing ta and the timing tc after the delay time td elapsed since the timing ta. In response to the abrupt drop of the battery voltage value VB after an elapse of the delay time td, the battery voltage value VB starts to intersect with the target voltage value Vrefb. Accordingly, the rising timing t1 of the first control pulse CP1 swiftly moves to be away from the reference timing t0. Meanwhile, the rising timing t2 of the second control pulse CP2 is adjusted and held at t2s. A period from the rising timing t1 moved away from the reference timing t0 until it coincides with the rising timing t2s is defined as the t1 preceding case. However, this period is extremely short because of the abrupt drop of the battery voltage value VB and is substantially as long as the length T of one control cycle CC. Hence, as is shown in FIG. 5(c), the excitation duty DUTY in this period is held substantially at 0.

In the first embodiment, the timing tb substantially coincides with the timing at which the battery voltage VB passes over the voltage value VBb corresponding to the target voltage value Vrefb once. At the timing tb, the rising timing t1 is delayed from the rising timing t2s, and after the timing tb, the ON time Ton of the power switch element 33 is determined by the rising timing t2. Hence, at the timing tb, as is shown in FIG. 5(c), the excitation duty DUTY rises from 0 to DUTY (Ds). At and after the timing tb, the state shifts to the normal state NC and is defined as the t2 preceding case. Hence, as is shown in Column (13) of FIG. 6, the rising timing t2 moves gradually behind ts2, and as is shown in FIG. 5(c), the excitation duty DUTY gradually increases toward DUTY(b) corresponding to the target Vrefb.

In the first embodiment, as is shown in FIG. 5(c), the excitation duty DUTY rises to DUTY(Ds) at the timing tb and gradually increases from DUTY(Ds). Hence, even in the case where the external control unit 49 gives the target change command TVC to change the target voltage value Vref from the target voltage value Vrefa with the high mean voltage to the target voltage value Vrefb with the low mean voltage, for example, when the vehicle load 25 is small, it becomes possible to suppress undershoot, that is, dropping of the output voltage of the vehicle AC generator 10 and the battery voltage value VB below the voltage value VBb corresponding to the changed target voltage value Vrefb with the low mean voltage. Hence, a feeling of discomfort, for example noticeable variance in illumination by the vehicle lights, can be eliminated.

Figure 7:
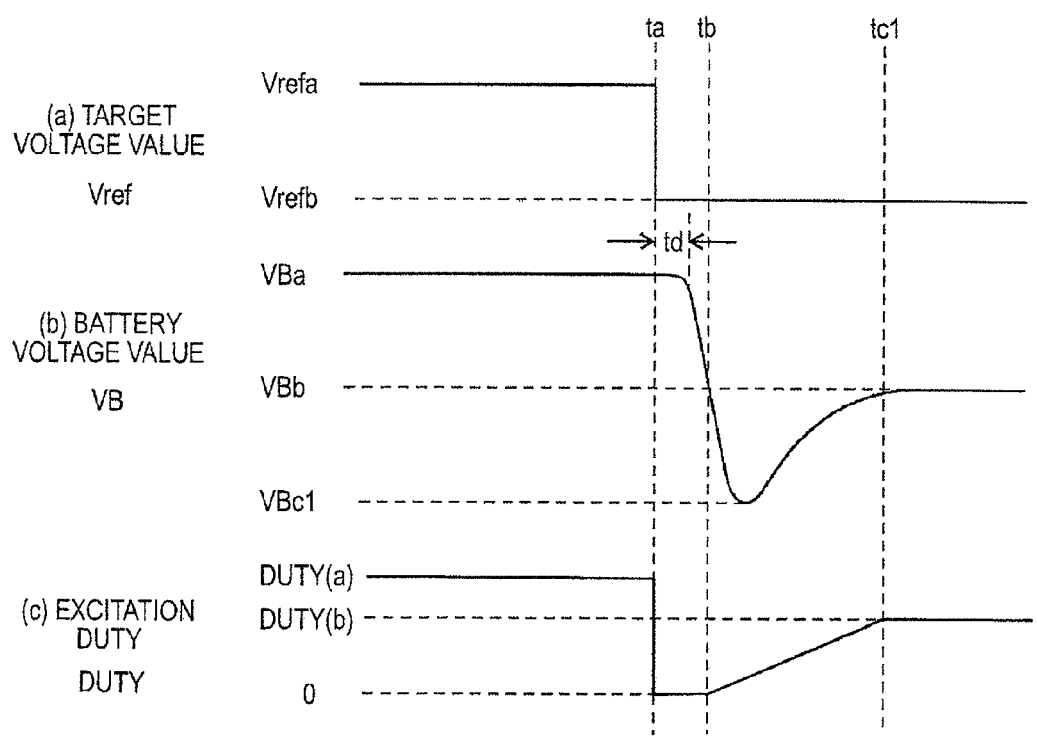
FIG. 7 is a timing chart for a comparative example showing variances of a target voltage value, a battery voltage value, and an excitation duty by way of example.

FIG. 7 shows a timing chart for a comparative example to be compared with the first embodiment corresponding to the timing chart of FIG. 5. The comparative example is not provided with the determination part 71, and a rate of increase same as the one in the region A is given to the excitation duty DUTY in the region B, too. Hence, as is shown in FIG. 7(c), at and after the timing tb, the excitation duty DUTY increases from 0(%) at the same rate of increase as that in the region A. According to the comparative example, in a case where the rising timing t1 moves to be away from the reference timing t0 between the timings to and tb, the state immediately shifts to the t2 preceding case and the ON time Ton of the power switch element 33 is determined by the rising timing t2. The rising timing t2 gradually moves by following the rising timing t1. However, because the rising timing t2 moves gradually, the excitation duty DUTY consequently increases gradually from 0(%) toward DUTY(b) at and after the timing tb. Hence, the battery voltage value VB drops to an undershoot value VBc1 lower than the undershoot value VBc of FIG. 5(c) after the timing tb. Accordingly, the timing at which the output voltage of the vehicle AC generator 10 and the battery voltage value VB settle at the voltage value VBb corresponding to the changed target voltage value Vrefb with the low mean voltage is delayed from tc to tc1. The comparative example therefore has a defect that gives a feeling of discomfort, for example, noticeable variance in illumination by the vehicle lights.

Second Embodiment

Figure 8:
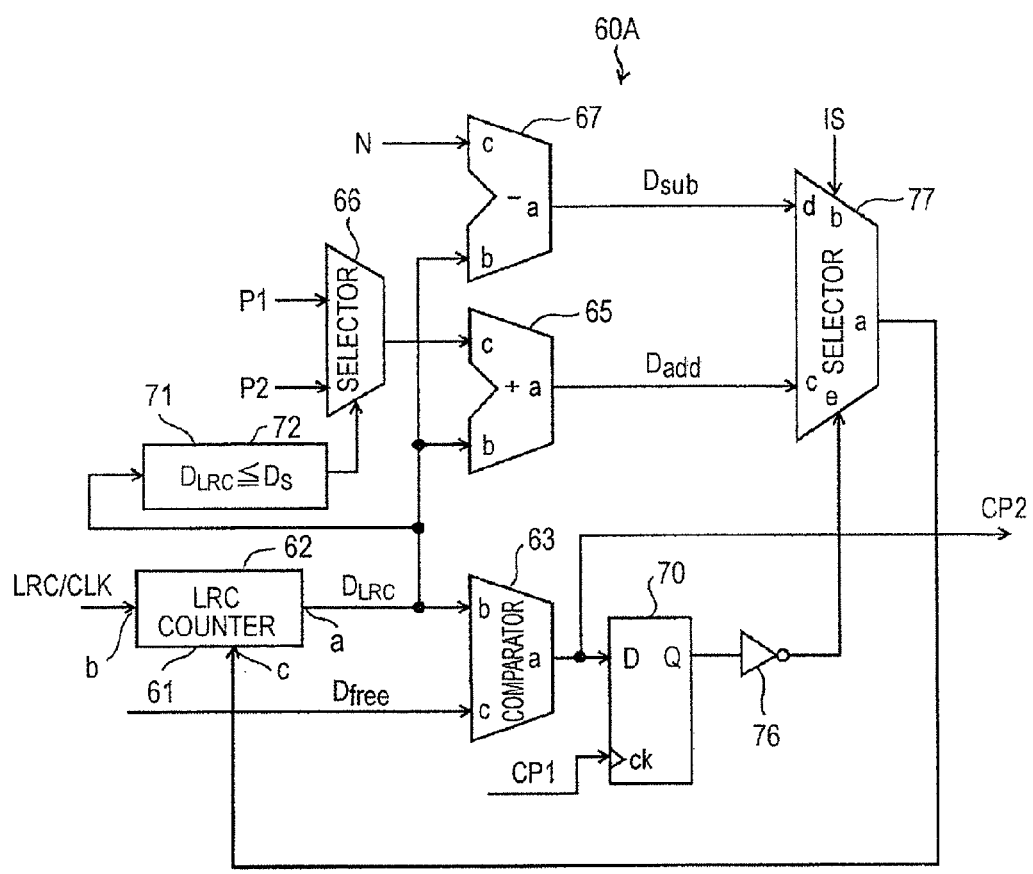
FIG. 8 is a block diagram showing a gradual excitation control circuit in a second embodiment of the control device for the vehicle AC generator according to the invention.

FIG. 8 is a block diagram showing a gradual excitation control 60A in a second embodiment of the control device for the vehicle AC generator according to the invention. In the second embodiment, the gradual excitation control circuit 60 in the first embodiment above is replaced with the gradual excitation control circuit 60A shown in FIG. 8. The second embodiment is of the same configuration as the first embodiment above except that the gradual excitation control circuit 60 in the first embodiment above is replaced with the gradual excitation control circuit 60A.

The gradual excitation control circuit 60A shown in FIG. 8 is formed in such a manner that the NAND circuit 75 in the gradual excitation control circuit 60 shown in FIG. 2 is replaced with an inverter 76, and the input c of the adder 65 is connected to a selector 66 so that the selector 66 selects either one of the first additional value P1 and the second additional value P2, while the output of the determination part is supplied to the selector 66. The rest of the configuration of the gradual excitation control 60A is the same as that of the gradual excitation control circuit 60. The second additional value P2 is set larger than the first additional value P1 and expressed as: P2>P1. The determination part 71 forms the duty characteristic varying means 72 as in the first embodiment above.

In the gradual excitation control circuit 60A, when the load response control count value DLRC drops to or below the predetermined count value Ds and the determination part 71 outputs the high-level output in the specific state SC, the selector 66 supplies the second additional value P2 to the input c of the adder 65. In the normal state NC, the load response control count value DLRC becomes larger than the predetermined count value Ds and the selector 66 supplies the first additional value P1 to the input c of the adder 65. The output Q of the D flip-flop 70 is inverted by the inverter 76 and supplied to the input e of the selector 77.

Figure 9:
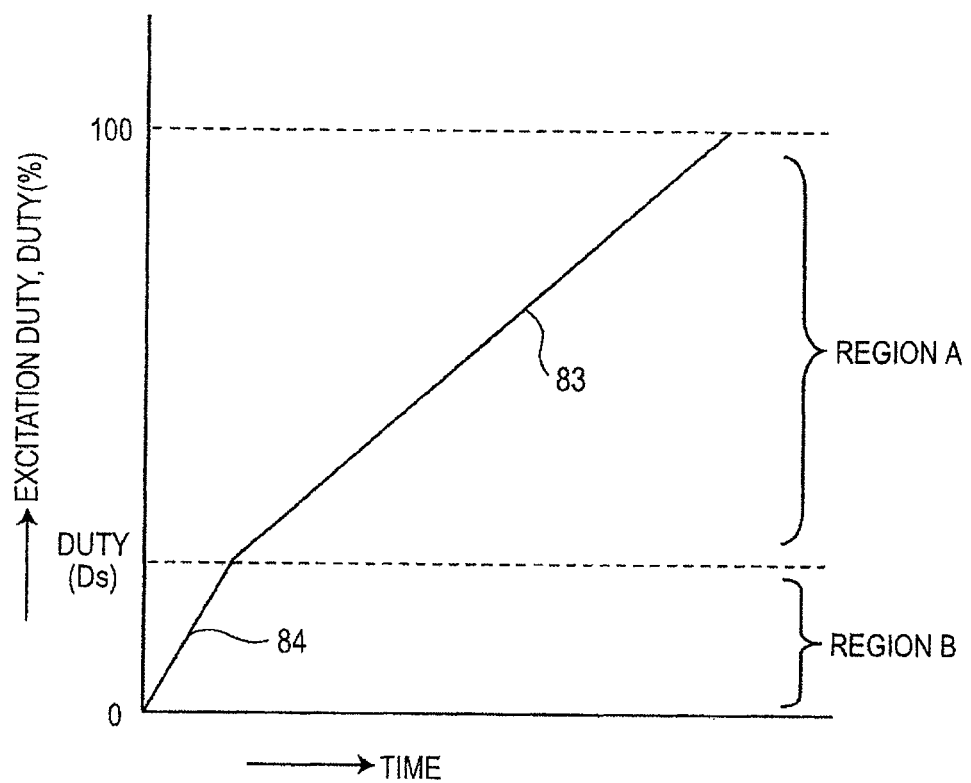
FIG. 9 is a characteristic view showing an excitation duty control characteristic by the second embodiment.

FIG. 9 shows an excitation duty control characteristic by the second embodiment. This excitation duty control characteristic is a characteristic of the excitation duty DUTY when it increases from 0(%) to 100(%) with time. As with the control characteristic of FIG. 3, this excitation duty control characteristic includes regions A and B. The boundary between the region A and the region B is the predetermined duty value DUTY(Ds). The predetermined duty value DUTY (Ds) corresponds to the predetermined count value Ds used in the determination part 71, and more specifically, it is set to 10 to 30(%), for example, 25(%). The region A corresponds to the normal state NC and it is a region corresponding to the excitation duty DUTY exceeding the predetermined duty value DUTY(Ds) corresponding to the predetermined count value Ds, that is, the excitation duty DUTY between the predetermined duty value DUTY(Ds) and 100%. In the region A, in a case where the excitation duty DUTY increases with time, the excitation duty DUTY increases linearly along a linear characteristic 83 inclined with respect to the time axis from the predetermined duty value DUTY(Ds) toward 100 (%). The region B corresponds to the specific state SC and it is a region corresponding to the excitation duty DUTY equal to or below the predetermined duty value DUTY(Ds), that is the excitation duty DUTY between the predetermined duty value DUTY(Ds) and 0(%). In the region B, in a case where the excitation duty DUTY increases with time, the excitation duty DUTY increases linearly along a linear characteristic 84 inclined with respect to the time axis from 0(%) toward the predetermined duty value DUTY(Ds).

The characteristic 83 is a control characteristic of the excitation duty DUTY in a case where the selector 66 supplies the first additional value P1 to the input c of the adder 65. In a case where the load response control count value DLRC is larger than the predetermined count value Ds and the determination part 71 outputs the low-level output, the excitation duty DUTY increases along the characteristic 83. The characteristic 84 is a control characteristic of the excitation duty DUTY in a case where the selector 66 supplies the second additional value P2 to the input c of the adder 65. In a case where the load response control count value DLRC is equal to or smaller than the predetermined count value Ds and the determination part 71 outputs the high-level output, the excitation duty DUTY increases along the characteristic 84. Because the second additional value P2 is larger than the first additional value P1, the inclination of the characteristic 84 with respect to the time axis is larger than that of the characteristic 83. Hence, when the excitation duty DUTY increases, a rate of increase becomes higher in the region B than in the region A.

In a case where the external control unit 49 changes the target voltage value Vref from the target voltage value Vrefa with the high mean voltage to the target voltage value Vrefb with the low mean voltage, for example, when the vehicle load 25 is small, there can be achieved an advantage that an undershoot value of the output voltage of the vehicle AC generator 10 and the battery voltage value VB can be made smaller with the control characteristic 84 of the excitation duty DUTY in the region B.

In the second embodiment, in the control state shown in Column (12) of FIG. 6, the rising timing t1 of the first control pulse CP1 first moves to the timing t10 that coincides with the reference timing t0. Then, the second control pulse CP2 moves by following the first control pulse CP1 so that the rising timing t2 of the second control pulse CP2 moves to a position at which the rising timing t2 also coincides with the reference timing t0. Thereafter, in a state where the rising timing t1 of the first control pulse CP1 moves swiftly to a position away from the reference timing t0 in association with the abrupt drop of the battery voltage value VB after an elapse of the time delay td so that the second control pulse CP2 determines the ON time Ton of the power switch element 33, the rising timing t2 of the second control pulse CP2 follows the first control pulse CP1 and gradually moves to be away from the reference timing t0.

In the second embodiment, when the rising time t2 moves to be away from the reference timing t0, the excitation duty DUTY increases from 0(%) to the predetermined duty DUTY (Ds) along the characteristic 84. Because the inclination of the characteristic 84 is large in comparison with the characteristic 83, the excitation duty DUTY consequently increases to the predetermined duty DUTY(Ds) in a shorter time. It thus becomes possible to suppress the undershoot value of the battery voltage value VB to a further smaller value.

Third Embodiment

Figure 10:
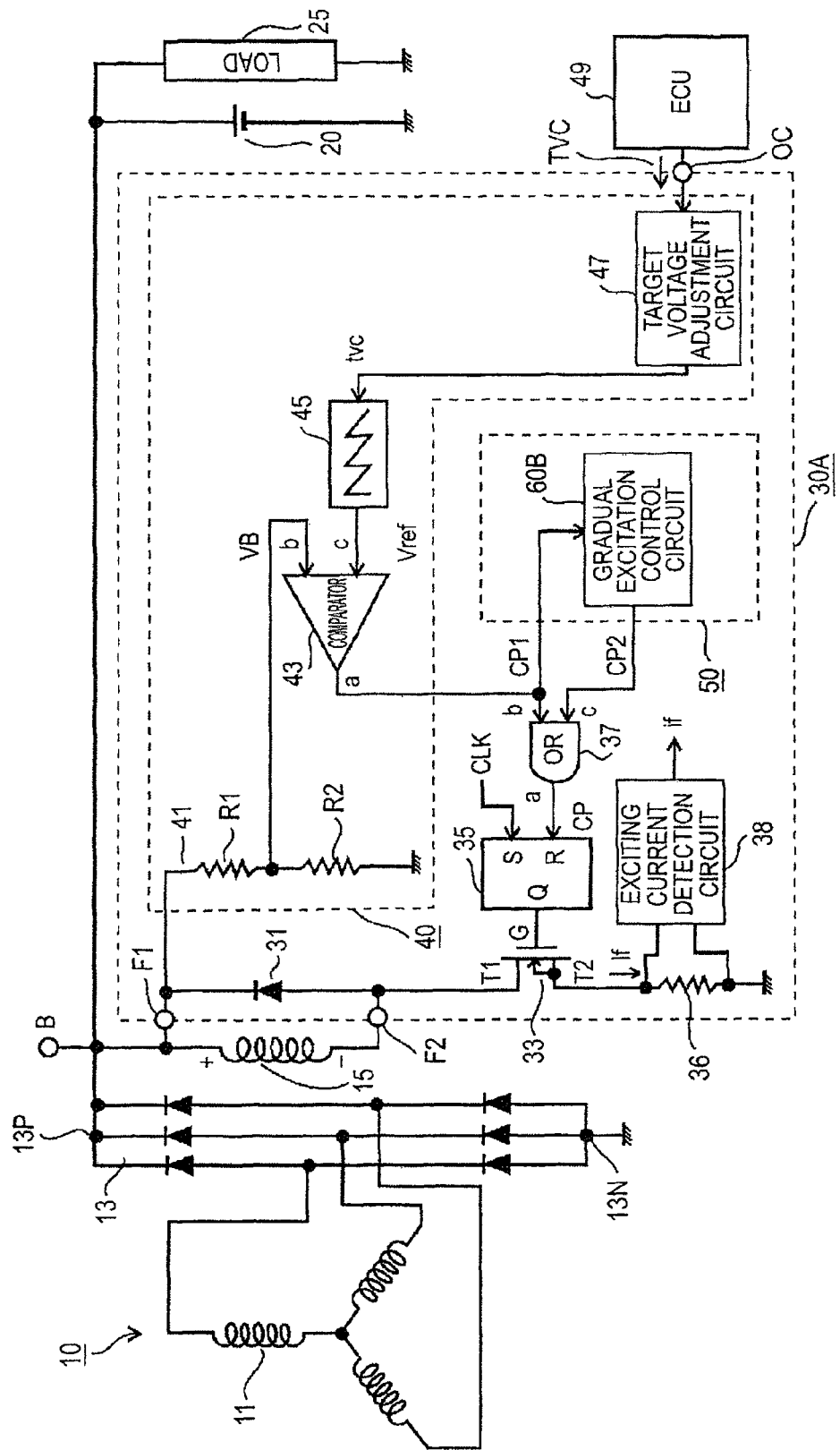
FIG. 10 is an electric circuit diagram showing a third embodiment of the control device for the vehicle AC generator according to the invention.
Figure 11:
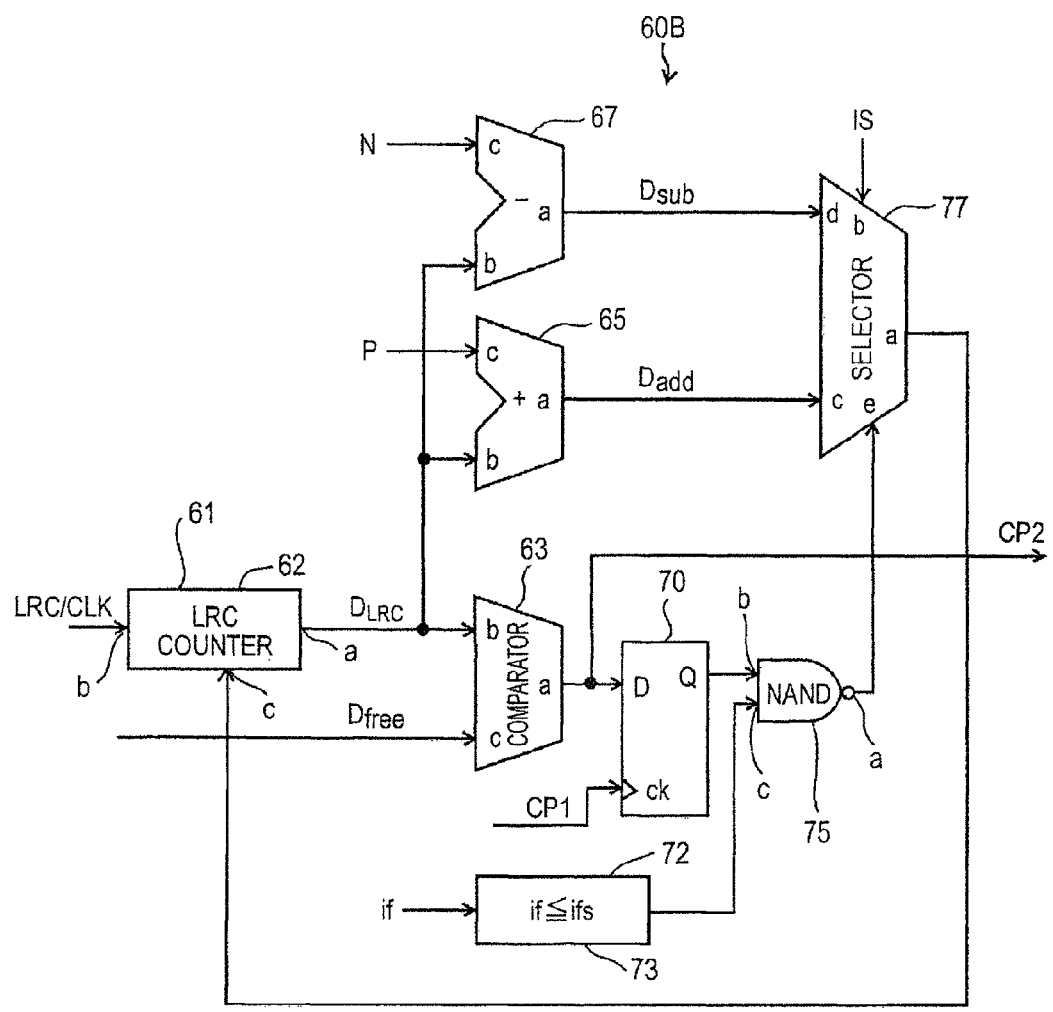
FIG. 11 is a block diagram showing a gradual excitation control circuit in the third embodiment.

FIG. 10 is an overall circuit diagram showing a third embodiment of the control device for the vehicle AC generator according to the invention. FIG. 11 is a block diagram showing a gradual excitation control circuit 60B used in the third embodiment. In the third embodiment, the voltage control unit 30 in the first embodiment above is replaced with a voltage control unit 30A. The third embodiment is of the same configuration as the first embodiment above except that the voltage control unit 30 is replaced with the voltage control unit 30A.

When compared with the voltage control unit 30 in the first embodiment above, in the voltage control unit 30A shown in FIG. 10, a detection resistor 36 is added between the power switch element 33 and the reference potential, that is, the ground, and an exciting current detection circuit 38 that detects an exciting current value if indicating the exciting current If flowing through the field coil 15 on the basis of a voltage across the detection resistor 36 is also added. The voltage control unit 30A uses the gradual excitation control circuit 60B shown in FIG. 11. In the gradual excitation control circuit 60B, the determination part 71 in the gradual excitation control circuit 60 shown in FIG. 2 is replaced with a determination part 73. The gradual excitation control circuit 60B is of the same configuration as the gradual excitation control circuit 60 except that the determination part 71 is replaced with the determination part 73.

The determination part 73 forms the duty characteristic varying means 72 as with the determination part 71 in the first embodiment above. The determination part 73 receives the exciting current value if indicating the exciting current If from the exciting current detection circuit 38 and compares the exciting current value if with a predetermined value ifs to determine whether the exciting current value if is equal to or smaller than the predetermined value ifs. A state where the exciting current value if is equal to or smaller than the predetermined value ifs corresponds to the specific state SC. In this state, an output of the determination part 73 is set to a high level. A state where the exciting current value if is larger than the predetermined value ifs corresponds to the normal state NC. In this state, the output of the determination part 73 is set to a low level. The output of the determination part 73 is supplied to the input c of the NAND circuit 75 as in the first embodiment above.

In the normal state NC where the exciting current value if is larger than the predetermined value ifs, the exciting duty DUTY is controlled according to the characteristic 81 in the region A of FIG. 3. In the case where the exciting current value if is larger than the predetermined value ifs, as in the case where the load response control count value DLRC is larger than the predetermined count value Ds in the first embodiment above, the addition output Dadd or the subtraction output Dsub is supplied to the count value control input c of the load response control counter 61 according to the output Q of the D flip-flop 70. Accordingly, the gradual excitation control circuit 60B controls the excitation duty DUTY according to the characteristic 81 of FIG. 3.

In the specific state SC where the exciting current value if is equal to or smaller than the predetermined value ifs, the excitation duty DUTY is controlled according to the characteristic 82 of FIG. 3. When the exciting current value if is equal to or smaller than the predetermined value ifs, as in the case where the load response control count value DLRC is equal to or smaller than the predetermined count value Ds in the first embodiment above, the gradual excitation control circuit 60B performs the t2 adjusting and holding operation to adjust and hold the excitation duty DUTY to the excitation duty value DUTY(Ds) corresponding to the predetermined value if on the count value control input c of the load response control counter 61 according to the high-level output of the determination part 73. Hence, the excitation duty DUTY is controlled according to the characteristic 82 of FIG. 3.

According to the third embodiment, as with the first embodiment above, even in a case where the external control unit gives a target change command TVC to change the target voltage value Vref from the target voltage value Vrefa with the high mean voltage to the target voltage value Vrefb with the low mean voltage, for example, when the vehicle load is small, it becomes possible to suppress undershoot, that is, dropping of the battery voltage VB equal to the output voltage of the vehicle AC generator 10 below VBb corresponding to the target voltage value Vrefb. Hence, a feeling of discomfort, for example, noticeable variance in illumination by the vehicle lights, can be eliminated.

Fourth Embodiment

Figure 12:
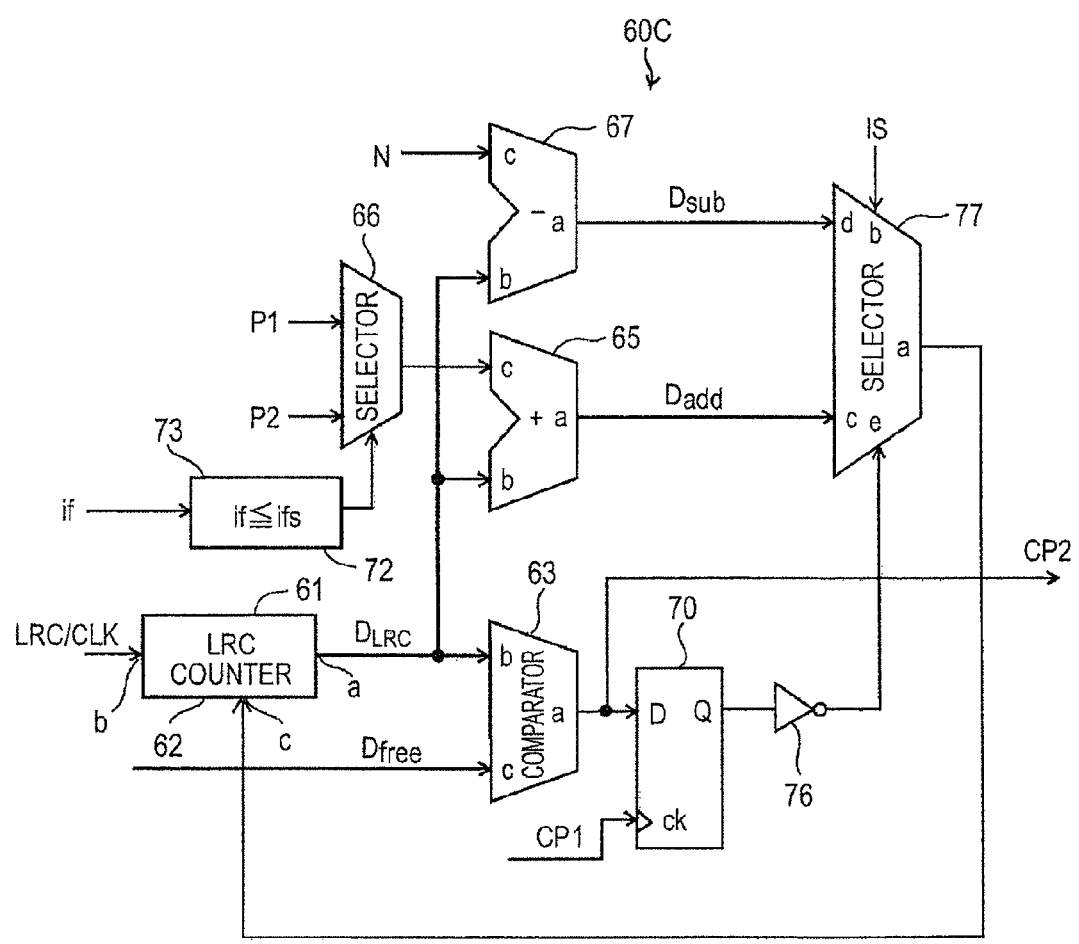
FIG. 12 is a block diagram showing a gradual excitation control circuit in a fourth embodiment of the control device for the vehicle AC generator according to the invention.

FIG. 12 is a block diagram showing a gradual excitation control circuit 60C in a fourth embodiment of the control device for the vehicle AC generator according to the invention. In the fourth embodiment, the gradual excitation control circuit 60B in the third embodiment above is replaced with the gradual excitation control circuit 60C shown in FIG. 12. The fourth embodiment is of the same configuration as the third embodiment above except that the gradual excitation control circuit 60B of the third embodiment above is replaced with the gradual excitation control circuit 60C.

The gradual excitation control circuit 60C shown in FIG. 12 is configured in such a manner that the NAND circuit 75 in the gradual excitation control circuit 60B shown in FIG. 11 is replaced with the inverter 76, and the selector 66 is connected to the input c of the adder 65 so that the selector 66 selects either one of the first additional value P1 and the second additional value P2, while the output of the determination part 73 is supplied to the selector 66. The rest of the gradual excitation control circuit 60C is the same as that of the gradual excitation control circuit 60B. The second additional value P2 is set larger than the first additional value P1 and expressed as: P2>P1.

With the gradual excitation control circuit 60C, in the specific state SC where the load response control count value DLRC is equal to or smaller than the predetermined count value Ds, the determination part 73 outputs the high-level output and the selector 66 supplies the second additional value P2 to the input c of the adder 65. In the normal state NC where the load response control count value DLRC is larger than the predetermined count value Ds, the selector 66 supplies the first additional value P1 to the input c of the adder 65. The output Q of the D flip-flop 70 is inverted by the inverter 76 and supplied to the input e of the selector 77.

The excitation duty control characteristic same as that shown in FIG. 9 can be obtained also by the gradual excitation control circuit 60C of the fourth embodiment. Because the determination part 73 outputs the low-level output in the normal state NC where the exciting current value if is larger than the predetermined value ifs, the excitation duty DUTY increases along the characteristic 83 of FIG. 9. Because the determination part 73 outputs the high-level output in the specific state SC where the exciting current value if is equal to or smaller than the predetermined value ifs, the excitation duty DUTY increases along the characteristic 84 of FIG. 9. Because the second additional value P2 is larger than the first additional value P1 also in the fourth embodiment, the inclination of the characteristic 84 with respect to the time axis is larger than that of the characteristic 83. Hence, when the excitation duty DUTY increases, a rate of increase is higher in the region B than in the region A.

In the fourth embodiment, too, in a case where the external control unit 49 changes the target voltage value Vref from the target voltage value Vrefa with the high mean voltage to the target voltage value Vrefb with the low mean voltage, for example, when the vehicle load 25 is small, there can be achieved an advantage that an undershoot value of the battery voltage value VB can be made smaller with the control characteristic 84 of the excitation duty in the region B as in the second embodiment above.

INDUSTRIAL APPLICABILITY

The control device for the vehicle AC generator according to the invention is applicable as a control device for vehicle AC generators of various types.

DESCRIPTION OF REFERENCE NUMERALS AND SIGNS

10: vehicle AC generator
15: field coil
30 and 30A: voltage control unit
33: power switch element
38: exciting current detecting means
49: external control unit
47: target voltage adjusting means
60, 60A, 60B, and 60C: gradual excitation control circuit
61: load response control counter
72: duty characteristic changing means
71 and 73: determination means

The invention claimed is:

1. A control device for a vehicle AC generator that feeds an in-vehicle battery and a vehicle load by rectifying an AC output of the vehicle AC generator, the control device comprising:
a voltage control unit that repetitively gives a control cycle to a power switch element controlling an exciting current flowing through a field coil of the vehicle AC generator and controls an output voltage of the vehicle AC generator to take a target voltage value by adjusting an excitation duty indicating an ON time ratio of the power switch element in each control cycle, wherein the voltage control unit includes, target voltage adjusting means for adjusting the target voltage value in response to a target change command from an external control unit, and a gradual excitation control circuit that controls the excitation duty to increase according to an excitation duty control characteristic when the vehicle load increases and when the target voltage adjusting means varies the target voltage value to a lower value, wherein the gradual excitation control circuit includes duty characteristic varying means for varying the excitation duty control characteristic, and wherein the duty characteristic varying means varies a rate of increase of the excitation duty in a predetermined region of the excitation duty control characteristic in comparison with other regions of the excitation duty control characteristic.

2. The control device for the vehicle AC generator according to claim 1, wherein the predetermined region is a region where the excitation duty is equal to or below a predetermined value.

3. The control device for the vehicle AC generator according to claim 1, wherein the excitation duty is gradually increased with time in the other region of the excitation duty control characteristic whereas the excitation duty is varied to hold a predetermined value with time in the predetermined region by the duty characteristic varying means.

4. The control device for the vehicle AC generator according to claim 1, wherein the excitation duty is gradually increased with time in the other region of the excitation duty control characteristic whereas the excitation duty is varied with time in the predetermined region at a rate of increase higher than a rate of increase in the other region by the duty characteristic varying means.

5. The control device for the vehicle AC generator according to claim 1, wherein the gradual excitation control circuit includes a load response control counter that counts a load response control clock and outputs a load response control count value, and wherein the duty characteristic varying means determines the predetermined region according to the load response control count value.

6. The control device for the vehicle AC generator according to claim 5, wherein the duty characteristic varying means includes determination means for comparing the load response control count value with a predetermined count value and determines the predetermined region according to an output of the determination means.

7. The control device for the vehicle AC generator according to claim 6, wherein the gradual excitation control circuit further includes, adding means for generating an addition output for the load response control count value, subtracting means for generating a subtraction output for the load response control count value, and a selector that controls the load response control counter by selecting either one of the addition output and the subtraction output, and wherein the determination means varies the rate of increase of the excitation duty in the predetermined region by controlling the selector.

8. The control device for the vehicle AC generator according to claim 6, wherein the gradual excitation control circuit further includes, adding means for selecting either one of a first additional value and a second additional value larger than the first additional value and generating an addition output for the load response control count value according to either one of the first additional value and the second additional value, subtracting means for generating a subtraction output for the load response control count value, and a selector that controls the load response control counter by selecting either one of the addition output and the subtraction output, and wherein the determination means controls the addition means to select the second additional value in the predetermined region.

9. The control device for the vehicle AC generator according to claim 1, wherein the duty characteristic varying means of the gradual excitation control circuit determines the predetermined region according to an exciting current value from exciting current detecting means for detecting the exciting current.

10. The control device for the vehicle AC generator according to claim 9, wherein the duty characteristic varying means includes determination means for comparing the exciting current value with a predetermined value and determines the predetermined region according to an output of the determination means.

11. The control device for the vehicle AC generator according to claim 10, wherein the gradual excitation control circuit includes, a load response control counter that counts a load response control clock and outputs a load response control count value, adding means for generating an addition output for the load response control count value, subtracting means for generating a subtraction output for the load response control count value, and a selector that controls the load response control counter by selecting either one of the addition output and the subtraction output, and wherein the determination means varies the rate of increase of the excitation duty in the predetermined region by controlling the selector.

12. The control device for the vehicle AC generator according to claim 9, wherein the gradual excitation control circuit includes, a load response control counter that counts a load response control clock and outputs a load response control count value, adding means for selecting either one of a first addition value and a second addition value larger than the first addition value and generating an addition output for the load response control count value according to either one of the first addition value and the second addition value, subtracting means for generating a subtraction output for the load response control count value, and a selector that controls the load response control counter by selecting either one of the addition output and the subtraction output, and wherein the duty characteristic varying means varies the rate of increase of the excitation duty in the predetermined region by controlling the selector.

* * * * *